(12) United States Patent
Koshida et al.

(10) Patent No.: US 7,053,140 B2
(45) Date of Patent: May 30, 2006

(54) COLORED THERMOPLASTIC RESIN COMPOSITIONS FOR LASER WELDING, COLORANTS THEREFOR OF MIXTURES OF AMINE SALTS OF ANTHRAQUINONE AND MONOAZO COMPLEX DYES, AND MOLDED PRODUCT THEREFROM

(75) Inventors: Reiko Koshida, Utsunomiya (JP); Yoshiteru Hatase, Osaka (JP); Ryuichi Hayashi, Tokyo (JP)

(73) Assignees: E. I. du Pont de Nemours and Company, Wilmington, DE (US); Orient Chemical Industries Ltd., Neyagawa (JP)

( * ) Notice: Subject to any disclaimer, the term of this patent is extended or adjusted under 35 U.S.C. 154(b) by 0 days.

(21) Appl. No.: 10/673,012

(22) Filed: Sep. 26, 2003

(65) Prior Publication Data

US 2004/0067378 A1    Apr. 8, 2004

Related U.S. Application Data

(63) Continuation of application No. 10/066,906, filed on Nov. 13, 2001, now abandoned.

(60) Provisional application No. 60/247,948, filed on Nov. 13, 2000.

(51) Int. Cl.
*C08K 5/08*    (2006.01)
*C08K 5/23*    (2006.01)
*C09B 1/16*    (2006.01)
*C09B 45/00*   (2006.01)

(52) U.S. Cl. .......................... 524/190; 524/358; 8/639; 8/643; 428/913

(58) Field of Classification Search .................. 8/639, 8/643; 524/190, 358; 428/913
See application file for complete search history.

(56) References Cited

U.S. PATENT DOCUMENTS 4,944,768 A * 7/1990 Balliello et al. ............... 8/524
5,893,959 A   4/1999 Muellich

FOREIGN PATENT DOCUMENTS

WO    WO 01/58997    8/2001

OTHER PUBLICATIONS

Encyclopedia of Polymer Science and Engineering, vol. 11: Polyamides, pp. 315-318, Jun. 1992.*
Derwent Abstract JP 62049850, "Procter & Gamble Co", Composition Backing Sheet . . . Allowing air Circulation Mar. 1987.
Derwent Abstract JP 62049850, Toyota Jidosha KK, "Joing Two Articles of Different Synthetic ResinArticles" Oct. 1987.

* cited by examiner

*Primary Examiner*—Ramsey Zacharia

(57) ABSTRACT

Thermoplastic resin compositions are described in which amine salts of anthraquinone dyes and monoazo complex dyes are added. These compositions show superior performance in laser welding applications.

10 Claims, 1 Drawing Sheet

COLORED THERMOPLASTIC RESIN COMPOSITIONS FOR LASER WELDING, COLORANTS THEREFOR OF MIXTURES OF AMINE SALTS OF ANTHRAQUINONE AND MONOAZO COMPLEX DYES, AND MOLDED PRODUCT THEREFROM

This application claims the benefit of U.S. Provisional Application No. 60/247,948, filed Nov. 13, 2000, and is a continuation of U.S. patent aplication Ser. No. 10/066,906, filed Nov. 13, 2001 now abandoned.

FIELD OF THE INVENTION

The instant invention pertains to thermoplastic resin compositions containing black colorants and suitable for laser welding. More particularly the invention relates to such compositions having as colorants mixtures of amine salts of anthraquinone and monoazo complex dyes.

BACKGROUND OF THE INVENTION

It is known in the art to join together two articles made of resins (and respectively opaque and transparent) by positioning them in contact with each other, transmitting a predetermined amount of laser beam focused on the junction of them and causing the junction portion to be melted and joined together ("laser welding"). Several advantages flow from laser welding versus conventional methods of joining plastic parts. For example, laser welding is widely known for its simple operation, labor savings, improvement of productivity, clear joints, and reduction of production cost. It is useful in various applications including the preparation of molded articles, including hollow shapes, in automobile industries and electric and electronic industries. Recently, work has intensified in the area of blends of thermoplastic resin and a colorant containing an organic dye or pigment. Better control of the conversion of laser energy to heat is achieved by the addition of such colorants to the resins. Laser beams penetrate through transparent articles positioned closer to the laser beam source, and are largely absorbed in the opaque article, which has a relatively higher absorption coefficient in comparison with the aforementioned transparent article. Careful attention to the amount of the colorants therein results in the junction portion being melted and the articles joined together.

See for example Japanese Published (Koukoku) Patent No.62-49850 and Japanese Published (Koukoku) Patent No.5 (93)-42336. Other resin compositions associated with the laser welding are described in U.S. Pat. No. 5,893,959 which discloses transparent and opaque workpiece parts welded together by a laser beam along a joining zone. Both parts contain black dye pigments such as carbon black to cause them to offer a substantially homogenous visual impression even after welding.

Other illustrations of the laser welding of compositions are found in U.S. Pat. No. 5,893,959. For example, the color of the thermoplastic components may be black (carbon black or nigrosine) which is commonly and widely used in the automobile industry among other applications. However, carbon black and nigrosine cannot transmit a laser beam with a main wavelength in the infra-red region (1200 nm to 800 nm), such as Nd:YAG laser and a diode laser, both of which are of wide use in industries.

Surprisingly, it has now been found that thermoplastic resin compositions both black in appearance can be used for laser-welded molded articles for both the transparent and opaque parts subjected to the laser beam. A significantly improved transmission to near-infrared light of the laser beam, with excellent and balanced heat-resistance and mechanical properties as required in automobile applications, is achieved by including a specific weight percentage of black dyes comprising a mixture of amine salts of anthraquinone dyes formed by reacting anthraquinone acid dyes.

Using these components, thermoplastic resin compositions can be utilized for laser welding and exhibiting improvements in moldability, solubility in the thermoplastic resin, bleeding- and blooming-resistance as well as transparency to the wavelength of a laser beam and resistance to chemicals.

SUMMARY OF THE INVENTION

This invention relates to thermoplastic compositions for laser welding comprising 1) thermoplastic resin and, 2) laser-transmitting black colorant comprising amine salts of anthraquinone dye and monoazo complex dye.

This invention relates to improved thermoplastic resin compositions for laser welding comprising thermoplastic resin, and at least one black dye comprising a mixture of (i) amine salts of anthraquinone dyes of formula [I] or formula [II] and (ii) monoazo complex dye of formula [III]. Formula [I] is as follows:

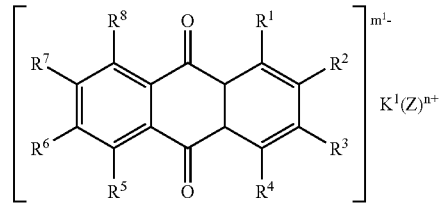

wherein $R^1$ to $R^8$, which may be the same or different, are independently selected from the group consisting of H, alkyl, aryl, alkenyl, alkoxy, amino, hydroxy, halogen atom, acyl, acyloxy, acylamide, acyl-N-alkylamide, carboxyl, alkoxycarbonyl, cyclohexylamide, sulfonyl, formula [I-a], or —Y—W, and at least one of $R^1$ to $R^8$ is of formula[I-a]; wherein Y is S, O, or NH; and wherein W is selected from unsubstituted or substituted alkyl group, alkenyl group; and unsubstituted or substituted aryl group; wherein $(Z)^{n+}$ represents ammonium ion or a cation derived from an organic amine compounds or a basic dye wherein n is 1 or 2, $m^1$ is an integer from 1 to 4; and wherein $K^1$ is the ratio of $m^1/n$.

Formula [I-a] is:

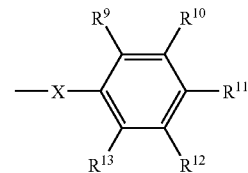

wherein X is O or NH, and $R^9$ to $R^{13}$, which may be the same or different, are independently selected from the group consisting of H, alkyl, aryl, alkenyl, alkoxy, amino, N-alkylamide, N-arylamide, hydroxy, halogen atom, acyl, acyloxy, acylamide, acyl-N-alkylamide, carboxyl, alkoxycarbonyl, or sulfonyl, and at least one of $R^1$ to $R^8$ and $R^9$ to $R^{13}$ is sulfonyl group.

Formula [II] is:

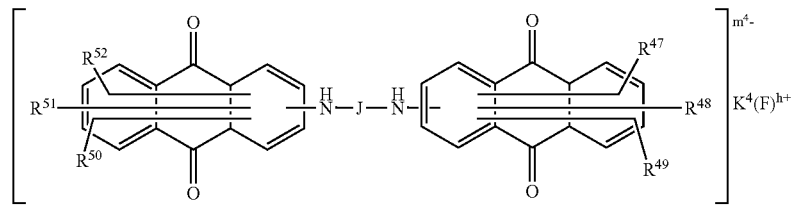

wherein $R^{47}$ to $R^{52}$, which may be the same or different, are independently selected from the group consisting of H, alkyl, aryl, alkenyl, alkoxy, amino, N-alkylamide, N-arylamide, hydroxy, halogen atom, acyl, acyloxy, acylamide, acyl-N-alkylaminde, carboxyl, alkoxycarbonyl, or sulfonyl, and at least one of $R^{47}$ to $R^{52}$ is of sulfonyl; and formula J in formula [II] is selected from formula [II-a] or formula [II-b] and binds two anthraquinone.

formula [II-a]:

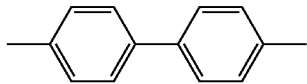

or
formula [II-b]:

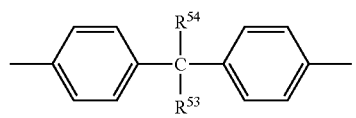

wherein $R^{53}$ to $R^{54}$, which may be the same or different, are independently selected from the group consisting of alkyl (having 1 to 8 carbon atoms) or hydrogen, and wherein $(F)^{h+}$ represents ammonium ion or a cation derived from an organic amino compounds or a basic dye wherein h is 1 or 2, $m^4$ is an integer from 1 to 4 and $K^4$ is the ratio of $m^4/h$. The monoazo complex dye of formula [III] is as follows:

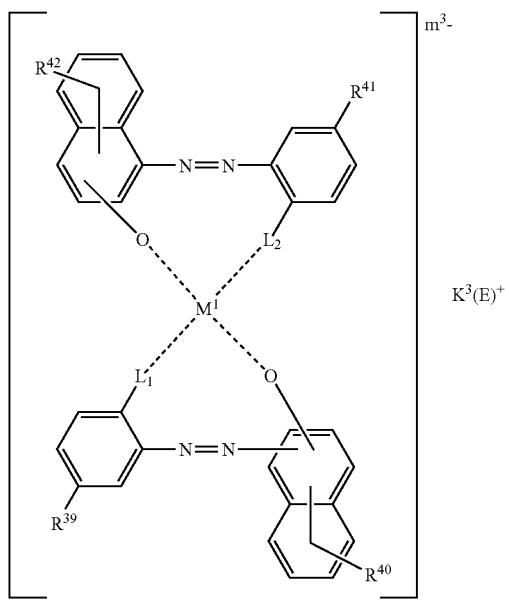

wherein $R^{39}$ and $R^{41}$, which may be the same or different, are Cl, $SO_2(-R^{44})(-R^{45})$, or $SO_2R^{43}$; $R^{44}$ and $R^{45}$, which may be the same or different, are independently hydrogen atom, linear or branched C1–C4 alkyl; $R^{43}$ is linear or branched C1–C4 alkyl; $R^{40}$ and $R^{42}$, which may be the same or different, are hydrogen, linear or branched C1–C18 alkyl group, linear or branched C2–C18 alkenyl group, sulfonamide group, carboxyl group, mesyl group, hydroxyl group, C1–C18 alkoxy group, acethylamino group, benzoylamino group, halogen atom or $-CONH-R^{46}$; $R^{46}$ is a functional group selected from unsubstituted or substituted linear or branched C1–C18 alkyl or unsubstituted or substituted C6–C18 aryl group; $L_1$ and $L_2$ are independently O or COO; $(E)^+$ are $H^+$; cations of alkali metals, ammonium ion, cations of organic amines selected from the group consisting of aliphatic primary, secondary and tertiary amines, and quaternary ammonium ion; $K^3$ is an integer; $m^3$ is 0, 1 or 2; and $M^1$ is a metal having ionic valency from 2 to 4, preferably trivalent metal such as Cr, Fe, or bivalent metal such as Cu.

By using these components, thermoplastic resin compositions are obtained for laser welding having improved moldability, solubility in the thermoplastic resin, bleeding- and blooming-resistance, and resistance to chemicals. Improvements in transparency to wavelength of a laser beam are also discussed, particularly at wavelengths exceeding 800 nm by mixing the dye salts mentioned of the formula [I] or formula [II] with monoazo complex dyes of the formula [III] at predetermined weight ratios. Particularly, the mixture serves to significantly improve transmittance at diode laser beam wavelength than that by monoazo complex dyes of formula [III] alone. These mixtures improve at the diode laser beam wavelength much more than that observed with the monoazo dye alone. See generally, WO01/58997 A1, for a discussion of thermoplastic resins and monoazo complex dyes. Therefore they are of interest in industrial diode laser welding.

The amine salts of anthraquinone dyes used as one of components comprised in colorant in the invention exhibits colors of blue, violet or green and the monoazo complex dyes comprised in the colorants used in the invention are black dyes

BRIEF DESCRIPTION OF THE DRAWINGS

The invention will be better understood upon having reference to the drawings herein.

DETAILED DESCRIPTION OF THE INVENTION

Figure 1:
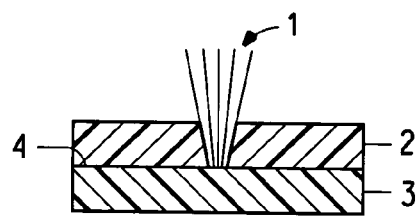
FIG. 1 is a view of the articles in contact and with a laser beam applied thereto.

The aforementioned dye salts of the desired structure represented by formula [I] or formula [II] used in the invention are prepared by commonly known methods, conveniently by reacting anthraquinone dyestuff with organic amine in a solvent. Mixtures of amine salts of anthraquinone dyes are formed by reacting anthraquinone acid dyes with organic amine, particularly sulfonyl group contained the dye reacting with ammonium salts from organic amine.

Suitable amines for use in producing the above-mentioned anthraquinone dyes in dyestuffs include aliphatic amine, alicyclic amine, alkoxyalkyl amine, amine having alkanol, diamine, amine of guanidine derivatives, and aromatic amine.

Basic dyes listed in the color index and useful in the instant invention include, C.I. basic red dye: C.I. basic red 1, 2, 3, 4, 5, 6, 8, 9, 10, 11, 12, 13, 15, 16, 17, 19, 20, 26, 27, 35, 36, 37, 48, 49, 52, 53, 54, 66, 68, C.I. basic blue dye: C.I. basic blue 1, 2, 3, 4, 5, 6, 7, 8, 9, 10, 11, 12, 13, 14, 15, 18, 20, 21, 22, 23, 24, 25, 26, 35, 36, 37, 45, 46, 47, 49, 50, 55, 56, 60, 62, 67, 75, 77, 79, 80, 81, 83, 87, 88, 89, 90, 94, 95, 96, 97, C.I. basic violet dye: C.I. basic violet 1, 2, 3, 4, 5, 6, 7, 8, 10, 11, 12, 13, 14, 15, 16, 17, 20, 21, 23, 24, 25, 27, 40, C.I. basic green dye: C.I. basic green 1, 3, 4, 6, 9, 10.

Examples of anthraquinone acid dyes which are useful in preparation of the dye salts of formula [I] used as colorant comprised in the compositions of the invention are given below in Tables 1-1 and 1-2. Descriptions in the left hand column (such as "I-2" and "I-13") will assist the reader in understanding discussions about specific dye salts later in the description.

TABLE 1-1

| Pro. Ex. No. | $R^1, R^2, R^3, R^4, R^5, R^6, R^7, R^8$ | $K^1(Z)^{n+}$ |
|---|---|---|
| I-1 | $R^2 = R^5 = R^6 = R^7 = R^8 = H$, $R^4 = OH$, $R^1 = R^3 = $ I-a, Formula[I-a]: $X = NH$, $R^{11} = NO_2 R^9 = SO_3H$ or $SO_3^-$, $R^{10} = R^{12} = R^{13} = H$ | Rosin anmmonium |
| I-2 | $R^2 = R^3 = R^5 = R^6 = R^7 = R^8 = H$, $R^4 = OH$, $R^1 = $ I-a, Formula[I-a]: $X = NH$, $R^{11} = CH_3$, $R^9 = SO_3^-$, $R^{10} = R^{12} = R^{13} = H$ | $H_3N^+(CH_2)_6NH_2$ |
| I-3 | $R^2 = R^3 = R^5 = R^6 = R^7 = R^8 = H$, $R^1 = $ I-a, $R^4 = $ Y-W, Formula[I-a]: $X = NH$, $R^{11} = CH_3$, $R^9 = SO_3^-, R^{10} = R^{12} = R^{13} = H$ Y-W: $Y = NH$, $W = CH_3$ | $C_{12}H_{25}N^+H_3$ |
| I-4 | $R^2 = R^3 = R^5 = R^6 = R^7 = R^8 = H$, $R^1 = R^4 = $ I-a, Formula[I-a]: $X = NH$, $R^{11} = CH_3$, $R^9 = SO_3H$ or $SO_3^-$, $R^{10} = R^{12} = R^{13} = H$ | $(C_4H_9)_4N^+$ |
| I-5 | $R^2 = R^3 = R^5 = R^6 = R^7 = R^8 = H$, $R^1 = R^4 = $ I-a, Formula[I-a]: $X = NH$, $R^9 = R^{11} = R^{13} = CH_3, R^{12} = SO_3H$ or $SO_3^-$, $R^{10} = H$ | $H_3N^+(CH_2)_6NH_2$ |
| I-6 | $R^2 = R^3 = R^5 = R^6 = R^7 = R^8 = H$, $R^1 = R^4 = $ I-a, Formula[I-a]: $X = NH$, $R^{11} = CH_3$, $R^9 = SO_3^-$, $R^{10} = R^{12} = H$ | $(N^+H_3)_2CNH$ |
| I-7 | $R^2 = R^3 = R^5 = R^6 = R^7 = R^8 = H$, $R^1 = R^4 = $ I-a, Formula[I-a]: $X = NH$, $R^{11} = C_4H_9, R^9 = SO_3H$ or $SO_3^-$, $R^{10} = R^{12} = R^{13} = H$ | $H_3N^+(CH_2)_6NH_2$ |
| I-8 | $R^2 = R^3 = R^5 = R^7 = R^8 = H$, $R^1 = R^4 = $ I-a, $R^6 = $ Y-W, Formula[I-a]: $X = NH$, $R^{11} = CH_3$, $R^9 = SO_3H$ or $SO_3^-$, $R^{10} = R^{12} = R^{13} $ H Y-W: $Y = S$, $W = $ methylphenyl | $H_3N^+(CH_2)_4NH_2$ |
| I-9 | $R^2 = R^3 = R^5 = R^6 = R^7 = R^8 = H$, $R^1 = R^4 = $ I-a, Formula[I-a]: $X = NH, R^{11} = C_4H_9$, $R^9 = SO_3^-$, $R^{10} = R^{12} = R^{13} = H$ | $2(H_3N^+(CH_2)_6NH_2)$ |
| I-10 | $R^2 = R^5 = R^6 = R^7 = R^8 = H$, $R^3 = SO_3^-$, $R^4 = NH_2$, $R^1 = $ I-a Formula[I-a]: $X = NH$, $R^{11} = N(C_3H_7)COCH_3$, $R^9 = R^{10} = R^{12} = R^{13} = H$ | N-trimethyl-N-benzyl Anmmonium |
| I-11 | $R^2 = R^5 = R^7 = R^8 = H, R^3 = R^6 = SO_3^-$, $R^4 = NH_2$, $R^1 = $ I-a, Formula[I-a]: $X = NH$, $R^{11} = NHCOCH_3$, $R^9 = R^{10} = R^{12} = R^{13} = H$ | $2(CH_3)_4N^+$ |
| I-12 | $R^2 = R^3 = R^5 = R^6 = R^7 = R^8 = H$, $R^1 = R^4 = $ I-a, Formula[I-a]: $X = NH$, $R^9 = R^{11} = R^{13} = CH_3$, $R^{12} = SO_3H$ or $SO_3^-$, $R^{10} = H$ | Diphenylguanidine anmmonium |
| I-13 | $R^2 = R^3 = R^5 = R^6 = R^7 = R^8 = H$, $R^1 = R^4 = $ I-a, Formula[I-a]: $X = NH$, $R^{11}$ $CH_3$, $R^9 = SO_3$ or $SO_3^-$, $R^{10} = R^{12} = R^{13} = H$ | Bis(p-methylphenyl) guanidine anmmonium |
| I-14 | $R^2 = R^3 = R^4 = R^5 = R^6 = R^7 = H$, $R^1 = R^8 = $ I-a, Formula[I-a]: $X = NH$, $R^{11} = CH_3$, $R^9 = SO_3H$ or $SO_3^-$, $R^{10} = R^{12} = R^{13} = H$ | $C_{12}H_{25}N^+H_3$ |
| I-15 | $R^5 = R^6 = R^7 = R^8 = H$, $R^1 = R^4 = NH_2$, $R^2 = R^3 = $ I-a, Formula[I-a]: $X = O$, $R^{11} = CH_3$, $R^9 = SO_3H$ or $SO_3^-$, $R^{10} = R^{12} = R^{13} = H$ | $(CH_3)_4N^+$ |

Pro. Ex. No. = Product Example Number

TABLE 1-2

| Pro. Ex. No. | $R^1, R^2, R^3, R^4, R^5, R^6, R^7, R^8$ | $K^1(Z)^{n+}$ |
|---|---|---|
| I-16 | $R^5 = R^6 = R^7 = R^8 = H$, $R^1 = R^4 = NH_2$, $R^2 = R^3 = $ I-a, Formula[I-a]: $X = O$, $R^{11} = SO_3H$, or $SO_3^-$, $R^9 = R^{10} = R^{12} = R^{13} = H$ | $H_3N^+(CH_2)_6NH_2$ |
| I-17 | $R^3 = R^6 = R^7 = R^8 = H$, $R^2 = CH_3$, $R^4 = NH_2$, $R^5 = SO_3H$ or $SO_3^-$, $R^1 = $ I-a, Formula [I-a]: $X = NH$, $R^{11} = CH_3$, $R^9 = SO_3H$ or $SO_3^-$, $R^{10} = R^{12} = R^{13} = H$ | $C_4H_9N^+H_3$ |
| I-18 | $R^3 = R^6 = R^7 = R^8 = H$, $R^2 = Br$, $R^4 = NH_2$, $R^5 = SO_3H$ or $SO_3^-$, $R^1 = $ I-a, Formula[I-a]: $X = NH$, $R^{11} = CH_3$, $R^9 = SO_3H$ or $SO_3^-$, $R^{10} = R^{12} = R^{13} = H$ | $H_3N^+(CH_2)_4NH_2$ |
| I-19 | $R^2 = R^6 = R^7 = R^8 = H$, $R^3 = OC_{12}H_{25}$, $R^4 = NH_2$, $R^5 = SO_3H$ or $SO_3^-$, $R^1 = $ I-a, Formula[I-a]: $X = NH$, $R^{11} = SO_3H$ or $SO_3^-$, $R^9 = R^{10} = R^{12} = R^{13} = H$ | $C_2H_5OC_3H_6NH_3^+$ |
| I-20 | $R_2 = R_3 = R_6 = R_7 = H$, $R^4 = R^8 = OH$, $R^1 = R^5 = $ I-a, Formula[I-a]: $X = NH$, $R^{11} = CH_3$, $R^9 = SO_3H$ or $SO_3^-$, $R^{10} = R^{12} = R^{13}$ H | $(C_8H_{17})_4 N^+$ |
| I-21 | $R^2 = R^3 = R^5 = R^6 = R^7 = R^8 = H$, $R^1 = R^4 = $ I-a, Formula[I-a]: $X = NH$, $R^9 = R^{11} = R^{13} = CH_3$, $R^{12} = SO_3^{-3}$, $R^{10} = H$ | $2(H_3N^+(CH_2)_6NH_2)$ |
| I-22 | $R^2 = R^5 = R^6 = R^7 = R^8 = H$, $R^3 = SO_3^-$, $R^4 = NH_2$, $R^1 = $ I-a, Formula[I-a]: $X = NH$, $R^{11} = NHCOCH_3$, $R^9 = R^{10} = R^{12} = R^{13} = H$ | $C_4H_9N^+H_3$ |
| I-23 | $R^2 = R^3 = R^5 = R^6 = R^7 = R^8 = H$, $R^1 = R^4 = $ I-a, Formula[I-a]: $X = NH$, $R^{11} = CH_3$, $R^9 = SO_3H$ or $SO_3^-$, $R^{10} = R^{12} = R^{13} = H$ | $H_3N^+(CH_2)_6NH_2$ |
| I-24 | $R^2 = R^3 = R^4 = R^5 = R^6 = R^7 = H$, $R^1 = R^8 = $ I-a, Formula[I-a]: $X = NH$, $R^{11} = CH_3$, $R^9 = SO_3H$ or $SO_3^-$, $R^{10} = R^{12} = R^{13} = H$ | $C_2H_5OC_3H_6NH_3^+$ |
| I-25 | $R^2 = R^5 = R^6 = R^7 = R^8 = H$, $R^3 = SO_3^-$, $R^4 = NH_2$, $R^1 = $ I-a, Formula[I-a]: $X = NH$, $R^{11} = NHCOCH_3$, $R^9 = R^{10} = R^{12} = R^{13} = H$ | $H_3N^+(CH_2)_6NH_2$ |
| I-26 | $R^2 = R^5 = R^6 = R^7 = R^8 = H$, $R^3 = SO_3^-$, $R^4 = NH_2$, $R^1 = $ I-a, Formula[I-a]: $X = NH$, $R^{11} = N(CH_3)COCH_3$, $R^9 = R^{10} = R^{12} = R^{13} = H$ | Cyclohexyl anmmonium |
| I-27 | $R^2 = R^3 = R^5 = R^6 = R^7 = R^8 = H$, $R^1 = R^4 = $ I-a, Formula[I-a]: $X = NH$, $R^9 = R^{11} = R^{13} = CH_3$, $R^{12} = SO_3H$ or $SO_3^-$, $R^{10} = H$ | $C_2H_5OC_3H_6N^+H_3$ |
| I-28 | $R^2 = R^3 = R^5 = R^6 = R^7 = R^8 = H$, $R^4 = OH$, $R^1 = $ I-a, Formula[I-a]: $X = NH$, $R^{11} = CH_3$, $R^9 = SO_3^-$, $R^{10} = R^{12} = R^{13} = H$ | $H_3N^+(CH_2)_6NH_2$ |
| I-29 | $R^2 = R^5 = R^6 = R^7 = R^8 = H$, $R^3 = SO_3^-$, $R^4 = NH_2$, $R^1 = $ I-a, Formula[I-a]: $X = NH$, $R^{11} = N(CH_3)COCH_3$, $R^9 = R^{10} = R^{12} = R^{13} = H$ | N-trimethyl-N-benzyl Anmmonium |
| I-30 | $R^3 = R^5 = R^6 = R^7 = R^8 = H$, $R^1 = R^4$ OH, $R^2 = $ I-a, Formula[I-a]: $X = NH$, $R^9 = CH_3$, $R^{11} = SO_3^-$, $R^{10} = R^{12} = R^{13} = H$ | N-tributhyl-N-benzyl anmmonium |
| I-31 | $R^5 = R^6 = R^7 = R^8 = H$, $R^1 = R^4 = NH_2$, $R^3 = SO_3^-$, $R^2 = $ I-a, Formula[I-a]: $X = O$, $R^9 = R^{10} = R^{11} = R^{12} = R^{13} = H$ | $C_4H_9N^+H_3$ |
| I-32 | $R^3 = R^6 = R^7 = R^8 = H$, $R^4 = NH_2$, $R^2 = R^5 = SO_3H$ or $SO_3^-$, $R^1 = $ I-a, Formula[I-a]: $X = NH$, $R^{11} = C_{12}H_{25}$, $R^9 = R^{10} = R^{12} = R^{13} = H$ | Benzylurea anmmonium |
| I-33 | $R^2 = R^5 = R^6 = R^7 = R^8 = H$, $R^3 = SO_3^-$, $R^4 = NH_2$, $R^1 = $ I-a, Formula[I-a]: $X = NH$, $R^{10} = COOC_2H_5$, $R^9 = R^{11} = R^{12} = R^{13} = H$ | $H_3N^+(CH_2)_6NH_2$ |

Pro. Ex. No. = Product Example Number

Examples of anthraquinone acid dyes which are useful in preparation of the dye salts of formula [II] used as colorants in the compositions of the invention are given below in Table 2.

TABLE 2

| Pro. Ex. No. | J | $R^{47}$ | $R^{48}$ | $R^{49}$ | $R^{50}$ | $R^{51}$ | $R^{52}$ | $K^4(F)^{h+}$ |
|---|---|---|---|---|---|---|---|---|
| II-1 | Formula [II-a] | $SO_3^-$ | $NH_2$ | H | $SO_3^-$ | $NH_2$ | H | $2(H_3N^+(CH_2)_6NH_2)^+$ |
| II-2 | formula [II-a] | $SO_3^-$ | $NH_2$ | H | $SO_3H$ | $NH_2$ | H | $H_3N^+(CH_2)_6NH_2$ |
| II-3 | formula [II-a] | $SO_3^-$ | OH | H | $SO_3H$ | OH | H | $C_{12}H_{25}N^+H_3$ |
| II-4 | Formula [II-b], $R^{53} = R^{54} = H$ | $SO_3^-$ | $NH_2$ | H | $NH_2$ | Cl | H | $C_2H_5OC_3H_6N^+H_3$ |
| II-5 | formula [II-b], $R^{53} = R^{54} = CH_3$ | $SO_3^-$ | $NH_2$ | H | $SO_3H$ | $NH_2$ | H | Bis(p-methylphenyl) guanidine anmmonium |
| II-6 | formula [II-b], $R^{53} = R^{54} = CH_3$ | $SO_3^-$ | $NH_2$ | H | $SO_3^-$ | $NH_2$ | H | $H_3N^+(CH_2)_4N^+H_3$ |
| II-7 | formula [II-b], $R^{53} = R^{54} = H$ | $SO_3^-$ | $NH_2$ | H | $SO_3H$ | $NH_2$ | H | Rosin anmmonium |
| II-8 | formula [II-b], $R^{53} = R^{54} = H$ | $SO_3^-$ | $NH_2$ | H | $SO_3H$ | $NH_2$ | H | $H_3N^+(CH_2)_6NH_2$ |

TABLE 2-continued

| Pro. Ex. No. | J | $R^{47}$ | $R^{48}$ | $R^{49}$ | $R^{50}$ | $R^{51}$ | $R^{52}$ | $K^4(F)^{h+}$ |
|---|---|---|---|---|---|---|---|---|
| II-9 | formula [II-b], $R^{53}$ = H, $R^{54}$ = phenyl | $SO_3^-$ | OH | $OCH_3$ | $SO_3H$ | OH | $OCH_3$ | $(C_4H_9)_4N^+$ |
| II-10 | formula [II-b], $R^{53}$ = $R^{54}$ = H | $SO_3^-$ | $C_3H_9$ | $C_3H_9$ | $SO_3H$ | H | H | N-tributhyl-N-benzyl Ammmonium |

Pro. Ex. No. = Product Example Number

Representative momoazo complex dyes represented by the formula [III] have a number of characteristics associated with them. For example, suitable cations for use in the monoazo complex dyes are $H^+$; cations of alkali metal, ammonium ion, cations of organic amine including aliphatic primary, secondary and tertiary amines, and quaternary ammonium ion.

Suitable amines for use in producing the above-mentioned monoazo complex dyes and common in dyestuffs include aliphatic amine, alicyclic amine, alkoxyalkyl amine, amine having alkanol, diamine, amine of guanidine derivatives, and aromatic amine.

Suitable metals for producing the above-mentioned monoazo complex dyes include metals having ionic valency from 2 to 4, more preferably trivalent metal such as Cr, Fe, or bivalent metal such as Cu.

Examples of the metal azo complex dyes of formula [III] are identified below in Tables 3 and 4. These are classified as formulas [II-a] and [III-b] respectively.

Formula [III-a]:

TABLE 3

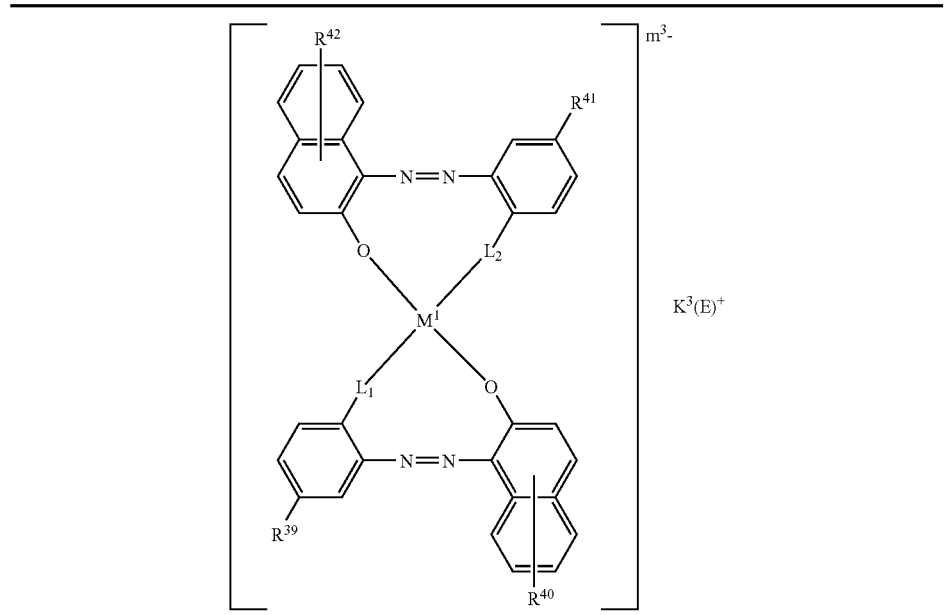

| Pro. Ex. No. | $R^{39}$ | $R^{40}$ | $R^{41}$ | $R^{42}$ | $M^1$ | $L_1$ | $L_2$ | $m^3$ | $K^3(E)^+$ |
|---|---|---|---|---|---|---|---|---|---|
| III-1 | Cl | H | Cl | H | Cr | O | O | 1 | $H^+$ |
| III-2 | $SO_2NH_2$ | H | $SO_2NH_2$ | H | Cr | O | O | 1 | $H^+$ |
| III-3 | Cl | H | Cl | H | Cu | O | O | 1 | $H^+$ |
| III-4 | $SO_2CH_3$ | H | $SO_2CH_3$ | H | Cr | O | O | 1 | $H^+$ |
| III-5 | Cl | H | Cl | H | Fe | O | O | 1 | $K^+$ |
| III-6 | Cl | benzoylamido | Cl | Benzoylamido | Fe | O | O | 1 | $H^+$ |
| III-7 | $SO_2NH_2$ | H | $SO_2NH_2$ | H | Cu | O | O | 1 | $H^+$ |
| III-9 | Cl | $NHCOCH_3$ | Cl | $NHCOCH_3$ | Cr | O | O | 1 | $NH_4^+$ |
| III-10 | Cl | H | Cl | H | Cr | O | O | 1 | $C_4H_9CH(C_2H_5)OC_3H_6NH_3^+$ |
| III-11 | Cl | H | Cl | H | Fe | O | O | 1 | $C_4H_9CH(C_2H_5)CH_2NH_3^+$ |
| III-12 | Cl | $C_8H_{17}$ | Cl | $C_8H_{17}$ | Cr | O | O | 1 | $NH_4^+$ |
| III-13 | Cl | H | Cl | H | Cu | COO | COO | 1 | $H^+$ |
| III-14 | $SO_2NH_2$ | H | $SO_2NH_2$ | H | Cr | O | O | 1 | $(C_4H_9)_4N^+$ |
| III-15 | $SO_2NH_2$ | $NHC_4H_9$ | $SO_2NH_2$ | $NHC_4H_9$ | Cr | O | O | 1 | $H^+$ |

Pro. Ex. No. = Production Example Number

Pro. Ex. No.=Product Example Number
Formula [III-b]:

TABLE 4

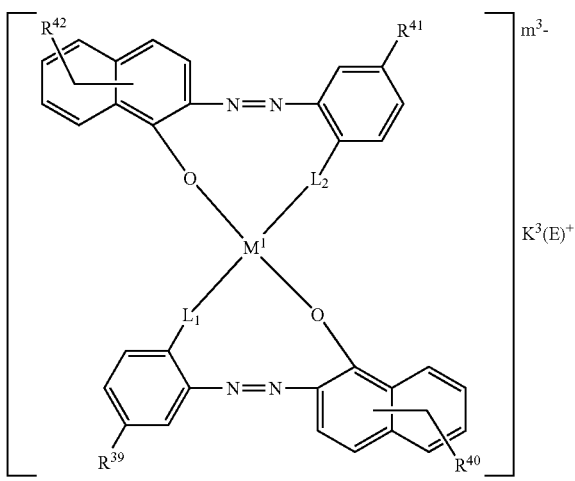

| Pro. Ex. No. | $R^{39}$ | $R^{40}$ | $R^{41}$ | $R^{42}$ | $M^1$ | $L_1$ | $L_2$ | $m^3$ | $K^3(E)^+$ |
|---|---|---|---|---|---|---|---|---|---|
| III-16 | Cl | H | Cl | H | Fe | O | O | 1 | $H^+$ |
| III-17 | $SO_2NH_2$ | H | $SO_2NH_2$ | H | Cu | O | O | 1 | $H^+$ |
| III-18 | Cl | H | Cl | H | Cr | O | O | 1 | $C_{12}H_{25}NH_3^+$ |
| III-19 | Cl | H | Cl | H | Cu | O | O | 1 | $C_2H_5OC_3H_6NH_3^+$ |
| III-20 | Cl | $C_4H_9$ | Cl | $C_4H_9$ | Cr | COO | COO | 1 | $H^+$ |

Pro. Ex. No. = Product Example Number

Examples of the black dyes containing a mixture of the dye salts of formula [I] or formula [II] and the metal azo complex dyes of formula [III] are below:

EXAMPLE 1

Black Dye

The anthraquinone dye salt of formula [I-21]: the monoazo complex dye of the following formula [III-1] in a weight ratio of 1:1.

EXAMPLE 2

Black Dye

The anthraquinone dye salt of formula [I-21]: the monoazo complex dye of the following formula [III-1] in a weight ratio of 3:1.

EXAMPLE 3

Black Dye

The anthraquinone dye salt of formula [I-6]: the monoazo complex dye of the following formula [III-1] in a weight ratio of 2:1.

EXAMPLE 4

Black Dye

The anthraquinone dye salt of formula [I-23]: the monoazo complex dye of the following formula [III-5] in a weight ratio of 2:1.

EXAMPLE 5

Black Dye

The anthraquinone dye salt of formula [II-8]: the monoazo complex dye of the following formula [III-1] in a weight ratio of 3:1.

EXAMPLE 6

Black Dye

The anthraquinone dye salt of formula [I-5]: the monoazo complex dye of the following formula [III-1]: anthraquinone yellow dye of the following formula [a] in a weight ratio of 4:3:1.

Formula [a]:

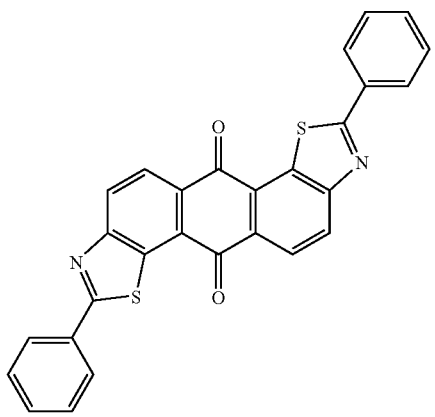

EXAMPLE 7

Black Dye

The anthraquinone dye salt of formula [I-21]: the monoazo complex dye of the following formula [III-1]: perinone red dye of the following formula [b] in a weight ratio of 6:3:1.

Formula [b]:

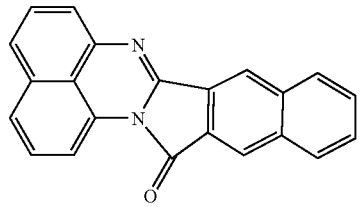

EXAMPLE 8

Black Dye

The anthraquinone dye salt of formula [I-21]: the anthraquinone dye salt of formula [II-5]: the monoazo complex dye of the following formula [III-14] in a weight ratio of 2:2:1.

The thermoplastic resins for use in the inventive compositions include polyamides, polyesters, and the like as are commonly used in making a molded product. As the examples of the polyamide resins utilized in the present invention, condensation products of dicarboxylic acids and diamines, condensation products of aminocarboxylic acids and ring-opening polymerization products of cyclic lactams can be cited. As examples of dicarboxylic acids, adipic acid, azelaic acid, sebacic acid, dodecanedioic acid, isophthalic acid and terephthalic acid can be cited. As examples of diamines, tetramethylene diamine, hexamethylene diamine, octamethylene diamine, nonamethylene diamine, dodecamethylene diamine, 2-methylpentamethylene diamine, 2-methyloctamethylene diamine, trimethylhexamethylene diamine, bis(p-aminocyclohexyl)methane, m-xylene diamine and p-xylene diamine may be cited. As the example of aminocarboxylic acid, 11-aminododecanoic acid can be cited. As the examples of cyclic lactam, caprolactam and laurolactam can be cited. As the specific examples of condensation products and ring-opening polymerization products, aliphatic polyamides such as nylon 6, nylon 66, nylon 46, nylon 610, nylon 612, nylon 11, nylon 12, semi-aromatic polyamides such as polymetaxylene adipamide (nylon MXD6), polyhexamethylene terephthalamide (nylon 6T), polyhexamethylene isophthalamide (nylon 6I) and polynonamethylene terephthalamide (nylon 9T), and copolymers and mixtures of these polymers can be cited. As the examples of the copolymers, nylon 6/66, nylon 66/6I, nylon 6I/6T and nylon 66/6T can be cited.

A wide range of common polyester molding compositions useful for blending with colorants in the practice of the present invention are know in the art. These include polymers which are, in general, condensation products of dicarboxylic acids and diols. Dicarboxylic acids can be selected from the group consisting of adipic acid, azelaic acid, sebacic acid, dodecanedioic acid, terephthalic acid, isophthalic acid, naphthalenedicarboxylic acid and diphenyl dicarboxylic acid, and diols can be selected from the group consisting of ethylene glycol, propylene glycol, butanediol, hexanediol, neopentyl glycol, cyclohexanediol, and bisphenol. A. Preferred polyesters include polyethylene terephthalate (PET), polypropylene terephthalate (3GT), polybutylene terephthalate (PBT), polyethylene 2,6-naphthalate (PEN), polycyclohexane dimethylene terephthalate (PCT) and copolymers and mixtures thereof. As the examples of the copolymers, some of dicarboxylic acids or some of diols can be added to the condensation products. Polyester polymers may be copolymerized a little amount of components like trimesic acid, trimellitic acid, pyromellitic acid, glycerol, and pentaerythritol which have more than 3 functional groups.

Additional other polymers such as polycarbonate can also be presented, provided that the essential characteristics of the composition of the present invention are not substantially altered.

The mixture of the amine salts of anthraquinone dyes of formula [I] or formula [II] with the monoazo complex dyes of the formula [III] is present in amount of from 0.01 to 1% by weight when the composition comprises polyamide 6 as at least the major component of the polyamide resin composition.

The ratio of amount of the amine salts of anthraquinone dyes of formula [I] or formula [II] to that of monoazo complex dyes of the formula [III] may be specialized for applications requiring different properties associated with the laser welding. Particularly, the preferable ratio of amount of them is from 5:1 to 1:1. If the ratio of amount of them is more than 5:1 (in other words if the amount of the amine salts of anthraquinone dyes is too much), there cannot obtain black colorant as colored resin compositions. On the other hand, if the ratio of amount of them is less than 1:1 (in other words if the amount of the monoazo complex dyes is too much), transmittance in diode laser beam wavelength (808 nm) is deteriorate.

The composition of the present invention may contain an inorganic filler or reinforcing agent that includes, for example, fibrous reinforcement such as glass fiber and carbon fiber, glass flakes, glass beads, talc, kaolin, wollastonite, silica, calcium carbonate, potassium titanate and mica. Glass fiber and glass flakes are a preferred selection. Glass fibers suitable for use in the present invention are those generally used as reinforcing agents for thermoplastic resins and thermosetting resins. The preferred amount of glass fiber in the resin composition of the present invention is from about 5 to about 120 parts by weight, with respect to 100 parts by weight of the thermoplastic resin. If it is under 5 weight percent, it would be difficult to give sufficient reinforcement from the glass fiber, and if it is over 120 weight percent, it would have poor processibility and poor transparency to laser. It is preferable to use about 5 to about 100 weight percent, and particularly preferable at about 15 to about 85 weight percent.

One or more optional compounds selected from a wide variety of compounds tailored for different applications of the resin compositions can be contained in the composition according to the present invention, as is understood among those having skill in the art.

Typically, additive compounds can include flame retardants, impact modifiers, viscosity modifiers, heat resistance improvers, lubricants, antioxidants and UV-and other stabilizers. The thermoplastic resin compositions of the present invention may have such additive compounds in suitable amounts so as not to harm characteristic properties of the composition.

In the present invention, thermoplastic resin compositions are provided that are suitable for laser welding, including transparent articles for laser beam transmission to achieve welding together with the opaque article for laser beam absorption. Suitable opaque articles and its compositions are described for example in DE-A-4432081.

Figure 2:
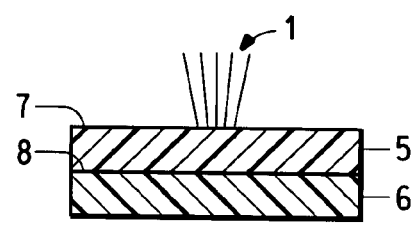
FIG. 2 is identical to FIG. 1, but with articles of the same color.

FIG. 1 is an illustration of a conventional laser welding arrangement. A laser beam 1 is transmitted through the first article 2 to the second article 3 containing laser beam absorbing combination, and the surface 4 of the second article 3 that have absorbed the laser energy 1 is melted and pressed with the surface of the first article 2 to weld them together. As shown in FIG. 2, the laser beam 1 is transmitted through the first article 5 at surface 7 to the second article 6, and the surface 8 of the second article 6 that have absorbed the laser energy 1 is melted and pressed with the surface of the first article 5 to weld them together. As shown in FIG. 2, two thermoplastic components must have different transmission and absorption coefficients and it is difficult to weld two articles having the same color. However, a problem with conventional compositions associated with the laser welding is that when a laser beam 1 is transmitted through the first article 2 to the second article 3 containing laser beam absorbing combination, and the surface 4 of the second article 3 that have absorbed the laser energy 1 is melted and pressed with the surface of the first article 2 to weld them together, as shown in FIG. 1, two thermoplastic components have to have different transmission and absorption coefficients and it is difficult to weld two articles having the same color. Therefore, a significant attribute of the instant invention is the use of both laser transmitting and laser absorbing parts molded by using two different compositions of which one is to transmit laser beam and another is to absorb it. Both are black in appearance and have other necessary properties for molding.

EXAMPLES

The present invention is illustrated by the following examples and comparative examples.

Example A 400 grams of (unreinforced) Nylon 6 ZYTEL pellets (available from E.I. DuPont de Nemours and Co., under the product name ZYTELS® 7301) were dried under vacuum at 120° C., for more than 8 hours, then mixed with a mixture of amine salt of anthraquinone dye of formula [I-21] (0.40 g) with monoazo complex black dye represented by the following formula [III-1] (0.40 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 250° C. Mold temperature was 60° C. Good and uniformly black appearance and surface gloss without color shading of the specimens were observed.

Example B 400 grams of (unreinforced) Nylon 6 ZYTEL pellets (available from E.I. DuPont de Nemours and Co., under the product name ZYTELS® 7301) were dried under vacuum at 120° C., for more than 8 hours, then mixed with a mixture of amine salt of anthraquinone dye of formula [I-21] (0.40 g) with monoazo complex black dye of the following formula [III-2] (0.40 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 250° C. Mold temperature was 60° C. Good and uniformly black appearance and surface gloss without color shading of the specimens were observed.

Example C 400 grams of (unreinforced) Nylon 66 ZYTEL101 pellets (available from E.I. DuPont de Nemours and Co.) were dried under vacuum at 120° C., for more than 8 hours, then mixed with a mixture of amine salt of anthraquinone dye of formula [II-8] (0.40 g) with monoazo complex black dye represented by the following formula [III-1] (0.40 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 290° C. Mold temperature was 60° C. Good and uniformly black appearance and surface gloss without color shading of the specimens were observed.

Comparative Example D 400 grams of (unreinforced) Nylon 6 ZYTEL pellets (available from E.I. DuPont de Nemours and Co., under the product name ZYTELS® 7301) were dried under vacuum at 120° C., for more than 8 hours, then mixed with a mixture of anthraquinone green dye of the following formula [c] (0.40 g) with monoazo complex black dye of the formula [III-1] (0.40 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 250° C. Mold temperature was 60° C. Black appearance of the specimens were observed.

Formula [c]:

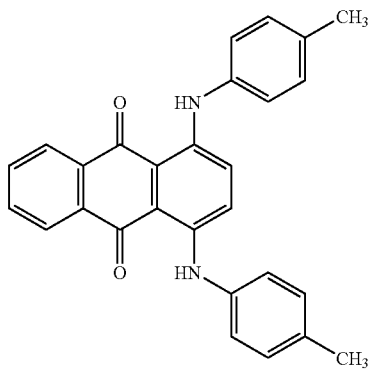

Comparative Example E 400 grams of (unreinforced) Nylon 6 ZYTEL pellets (available from E.I. DuPont de Nemours and Co., under the product name ZYTEL® 7301) were dried under vacuum at 120° C., for more than 8 hours, then mixed with a mixture of anthraquinone violet dye of the following formula [d] (0.40 g) with monoazo complex black dye (C.I. Acid Black 52 diphenylguanidine salts) (0.40 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 250° C. Mold temperature was 60° C. Good and uniformly black appearance and surface gloss without color shading of the specimens were observed.

Formula [d]:

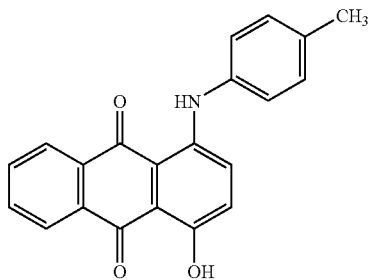

Test Procedures (1) Transmission Properties

Transmittance (T) in the range of 400 nm to 1200 nm of the test plates with laser beams having respective wavelengths of 940 nm (Semiconductor laser) and 1064 nm (YAG laser) was measured using a U-3410 spectrometer producted by Hitachi with 60 φ sphere photometer for wavelength from ultraviolet to near-infrared. The ratio (TA) of transmission with 940 nm:transmission with 1064 nm, the ratio (TB) of transmission with 940 nm:tarnsmission of natural resin are determined and compared between the examples and the ratio (TC) of transmission with 1064 nm:tarnsmission of natural resin are determined and compared between the examples.

(2) Appearance and surface gloss

Appearance of the test plates were evaluated by measuring Reflection Density (OD) of the test plates by Refelection Density meter TR-927 produced by Macbeth. Test plates having higher OD values are judged to have better surface smoothness and rich in gloss.

(3) Light Resistance

Each test plate was exposed to Xenon Weather Meter (produced by Toyo Seiki K.K., trade name: AtlasCI-4000) for 150 hours according to the following condictions, the amount of color fading and discoloration ΔE between "before" and "after" light irradiation was determined and measured using a colorimeter (produced by Juki, trade name: JP 7000).

Conditions of Light Resistance Test Procedure

Radial illumination (W/m$^2$)(E) 60

Black standard temperature (° C.) 83

Rain test N

Chamber temeparture (° C.) 55

Moisture (%) 50

The test plate having greater ΔE are judged to have greater discoloring and fading.

(4) Thermal Resistance

The amount of color fading and discoloration ΔE between before and after each test plate being placed and kept in an oven at 160° C. for 15 days was determined and measured using a colorimeter (produced by Juki, trade name: JP 7000).

(5) Moisture Resistance

The amount of color fading and discoloration ΔE between before and after each test plate being placed and kept in a thermoregulator at 80° C. (a humidity was 95%) for one week was determined and measured using a colorimeter (produced by Juki, trade name: JP 7000).

(6) Solubility Resistance in organic solvents

The amount of color fading and discoloration ΔE between before and after each test plate being immersed in ethyleneglycol and made airtight, then kept in thermoregulator at 40° C. for 48 hours was determined and measured using a colorimeter (produced by Juki, trade name: JP 7000).

The test plate having greater ΔE are judged to have greater discoloring and fading.

The results are set forth in the following Table 5.

TABLE 5

|  |  | Example A | Example B | Example C | Comparative Example D | Comarative Example E |
|---|---|---|---|---|---|---|
| Transmission | TA | 0.83 | 0.82 | 0.77 | 0.63 | 0.48 |
|  | TB | 0.81 | 0.90 | 0.74 | 0.62 | 0.45 |
|  | TC | 0.90 | 1.03 | 0.89 | 0.96 | 0.93 |
| OD |  | 2.55 | 2.51 | 2.49 | 2.52 | 2.43 |
| Light Resistance ΔE |  | 1.16 | 1.29 | — | 1.33 | 1.39 |
| Thermal Resistance ΔE |  | 0.51 | 0.60 | 0.72 | 0.80 | 0.75 |
| Solubility Resistance | Test Plate | 0.18 | 0.15 | — | 0.84 | 0.68 |
| ΔE | Solvent | 0.09 | 0.04 | — | 1.05 | 0.83 |
| Moisture Resistance ΔE |  | 0.14 | 0.16 | 0.26 | 1.22 | 0.94 |

This testing demonstrates that Examples A, B and C showed as high transmittance as a natural resin at a main wavelength in infra-red region (800 nm to 1200 nm). In Examples A, B and C, thermal, solubility and moisture resistances were good, compared with Comparative Examples D and E. Because Comparative Examples D and E including a neutral anthraquinone have property to dissolve from the test piece in ethylenglycol and have high possibility to discolor in rich humid atmosphere.

In Example F, G and Comparative Example H, we inspected the influence of the transmittance is inspected against the ratio of amine salt of anthraquinone dye to monoazo complex black dye.

Example F 400 grams of (unreinforced) Nylon 6 ZYTEL pellets (available from E.I. DuPont de Nemours and Co., under the product name ZYTEL® 7301) were dried under vacuum at 120° C., for more than 8 hours, then mixed with a mixture of amine salt of anthraquinone dye of formula [I-21] (0.53 g) with monoazo complex black dye represented by the following formula [III-1] (0.27 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 250° C. Mold temperature was 60° C. Good and uniformly black appearance and surface gloss without color shading of the specimens were observed.

Example G 400 grams of (unreinforced) Nylon 6 ZYTEL pellets (available from E.I. DuPont de Nemours and Co., under the product name ZYTEL® 7301) were dried under vacuum at 120° C., for more than 8 hours, then mixed with a mixture of amine salt of anthraquinone dye of formula [I-21] (0.60 g) with monoazo complex black dye represented by the following formula [III-1] (0.20 g) in a stainless tumble mixer with stirring for one hour. The mixture was then injection molded to form the injection molded test specimens (whose sizes are 48 mm×86 mm×3 mm) using K50-C the product name ZYTEL® 7301) and dyes were dry-blended with the amount described on the table 7. The blended material was molded into test pieces for laser welding, with dimension illustrated as FIG. 3, on the K50-C injection molding machine (manufactured by Kawaguchi Steel K.K.) with cylinder temperature set at 250° C. and mold temperature set at 60° C. Transmittance of the 2-mm thick part of the above molded test piece was measured with U-3410 spectrometer (manufactured by Hitachi) and transmittance at 940 nm was recorded.

Laser welding was conducted using two pieces of the test pieces described above, combined as illustrated in FIG. 4. Each Example from I to M and Comparative Example N was used as Upper test piece and Comparative Example O was used as Lower test piece. Diode laser (wavelength 940 nm, manufactured by Rofin-Sinar Laser GmbH) was irradiated at 50 W power and with speed at 1 m/minute, with 3 mm diameter. Strength of the welded test pieces was measured on Autograph (manufactured by Shimazu Seisakusho) by pulling apart at 50 nm/minute and its maximum load was recorded.

Figure 3:
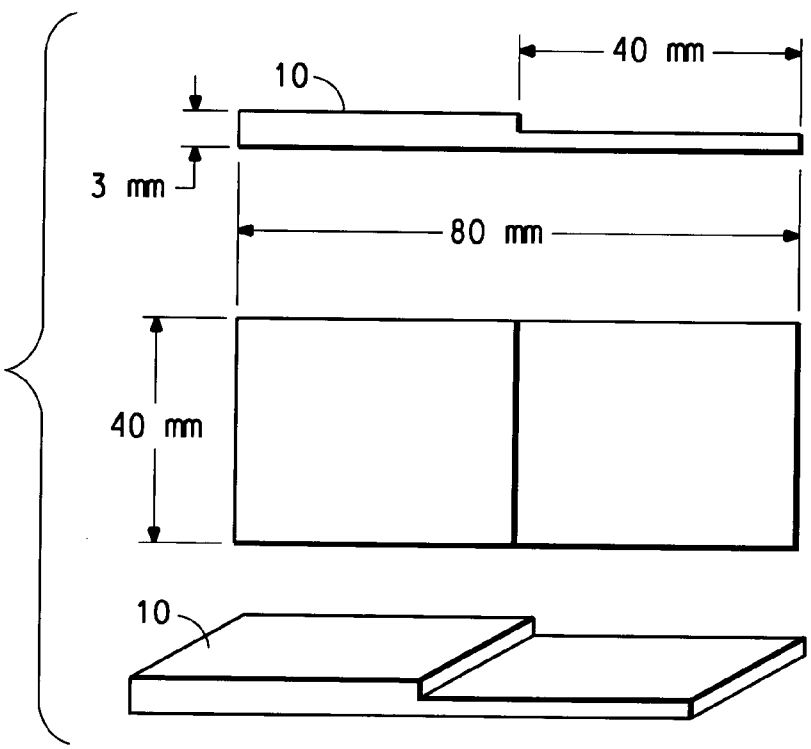
FIGS. 3–4 depict the laser welding test carried out in this application.
Figure 4:
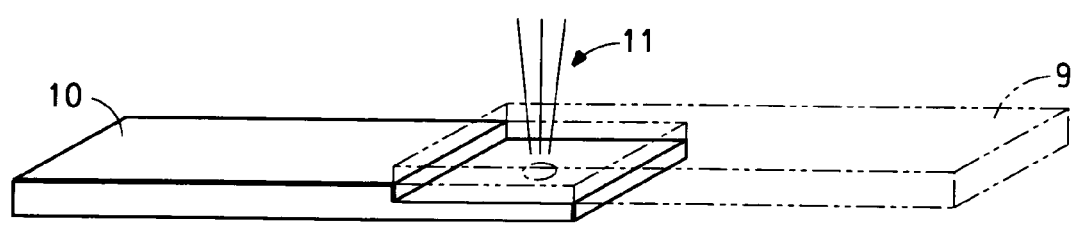

In FIG. 3 herein, there is shown a lower test piece 10 used in the laser welding test of these examples. The noted dimensions create a notch in the test piece 10. The upper test piece 9 is of the same construction and dimensions. In FIG. 4, there is show the joinder of upper test piece 9 to lower test piece 10, and the movement of the laser 11 (in the direction of the arrow) to form the weld. produced by Kawaguchi Steel K.K. and the cylinder temperature was set to 250° C. Mold temperature was 60° C. Good and uniformly black appearance and surface gloss without color shading of the specimens were observed.

Comparative Example H 400 grams of (unreinforced) Nylon 6 ZYTEL pellets (available from E.I. DuPont de Nemours and Co., under the product name ZYTEL® 7301) were dried under vacuum at 120° C., for more than 8 hours, then mixed with monoazo complex black dye represented by the following formula [III-1] (0.80 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 250° C. Mold temperature was 60° C. Good and uniformly black appearance and surface gloss without color shading of the specimens were observed.

Table 6 provides a comparison of Examples F, G and Comparative Example H.

TABLE 6

| | | Example F | Example G | Comparative Example H |
|---|---|---|---|---|
| Transmission | TA | 0.85 | 0.88 | 0.43 |
| | TB | 0.82 | 0.85 | 0.42 |
| | TC | 0.90 | 0.90 | 0.88 |
| OD | | 2.45 | 2.45 | 2.45 |
| Thermal Resistance ΔE | | 0.36 | 0.56 | 0.25 |
| Moisture Resistance ΔE | | 0.26 | 0.36 | 0.20 |

Comparative Example H showed low transmittance at diode laser wavelength(800 nm to 950 nm). Therefor, it is not a good candidate.

Example I

Example M, Comparative Example N, O

Laser Welding Test

Pellets of unreinforced nylon 6 (available from E.I. DuPont de Nemours and Co., under

TABLE 7

| | Example I | Example J | Example K | Example L | Example M | Comp. Ex. N | Comp. Ex. O |
|---|---|---|---|---|---|---|---|
| Nylon 6 | 400 g | 400 g | 400 g | 400 g | 400 g | 400 g | 400 g |
| Amine salt of anthraquinone dye [I-21] | 0.67 g | 0.64 g | 0.6 g | 0.53 g | 0.40 g | 0.80 g | |
| Monoazo complex black dye [III-1] | 0.13 g | 0.16 g | 0.2 g | 0.27 g | 0.40 g | | |

TABLE 7-continued

|  | Example I | Example J | Example K | Example L | Example M | Comp. Ex. N | Comp. Ex. O |
|---|---|---|---|---|---|---|---|
| NUBIAN COMPLEX BLACK G04 |  |  |  |  |  |  | 0.80 g |
| Color Appearance | Black | Black | Black | Black | Black | Blue | Black |
| Transmittance at 940 mn (2 mm thick) | 68% | 67% | 66% | 65% | 63% | 71% | 0.12% |
| Laser Weld Strength (kgf) | 162 | 165 | 174 | 166 | 142 | 176 | — |

NUBIAN COMPLEX BLACK G04 (Product name: product of Orient Chemical Industries Ltd): a mixture of carbon and nigrosine.

The invention claimed is:

1. A thermoplastic resin composition for laser welding comprising:
   1) thermoplastic resin; and
   2) laser-transmitting black colorant comprising amine salts of anthraquinone dye and monoazo complex dye, wherein the amine salts of anthraquinone dye and the monoazo metal complex dye are present in a weight ratio of from 5:1 to 1:1.

2. The composition of claim 1 wherein the thermoplastic resin is polyamide or polyester.

3. The composition of claim 1 further comprising reinforcing agent.

4. An article formed by laser welding an opaque article for laser beam with the transparent article of claim 3 using said laser beam.

5. The transparent article for laser beam welding formed from the composition of claim 1.

6. The composition of claim 1 wherein said monoazo metal complex dye is a 1:2 type monoazo metal complex dye.

7. A thermoplastic resin composition for laser welding comprising:
   1) thermoplastic resin; and,
   2) laser-transmitting black colorant comprising a mixture of
      a) amine salt of anthraquinone dyes of formula [I] or formula [II] wherein formula [I] is:

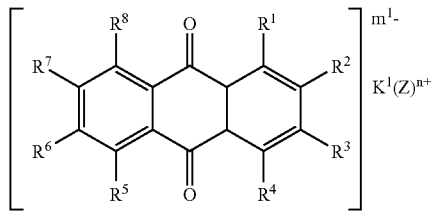

wherein $R^1$ to $R^8$, which may be the same or different, are independently selected from the group consisting of H, alkyl, aryl, alkenyl, alkoxy, amino, hydroxy, halogen atom, acyl, acyloxy, acylamide, acyl-N-alkylamide, carboxyl, alkoxycarbonyl, cyclohexylamide, sulfonyl, formula [I-a], or —Y—W, and at least one of $R^1$ to $R^8$ is of formula [I-a]; wherein Y is S, O, or NH; and wherein W is selected from unsubstituted or substituted alkyl group, alkenyl group, and unsubstituted or substituted aryl group; wherein $(Z)^{n+}$ represents a cation derived from an organic amine compounds or a basic dye; wherein n is 1 or 2, $m^1$ is an integer from 1 to 4 and $K^1$ is the ratio of $m^1/n$; and wherein formula [I-a] is:

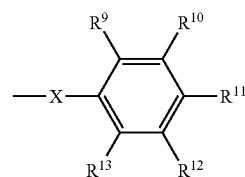

wherein X is O or NH, and $R^9$ to $R^{13}$, which may be the same or different, are independently selected from the group consisting of H, alkyl, aryl, alkenyl, alkoxy, amino, N-alkylamide, N-arylamide, hydroxy, halogen atom, acyl, acyloxy, acylamide, acyl-N-alkylamide, carboxyl, alkoxycarbonyl, or sulfonyl; wherein at least one wherein at least one of $R^1$ to $R^{13}$ is sulfonyl group; wherein formula [II] is:

wherein $R^{47}$ to $R^{52}$, which may be the same or different, are independently selected from the group consisting of H, alkyl, aryl, alkenyl, alkoxy, amino, N-alkylamide, N-arylamide, hydroxy, halogen atom, acyl, acyloxy, acylamide, acyl-N-alkylamide, carboxyl, alkoxycarbonyl, or sulfonyl; and at least one of $R^{47}$ to $R^{52}$ is of sulfonyl, and fomula J in formula [II] is selected from formula [II-a] or formula [II-b] and binds two anthraquinone; wherein formula [II-a] is:

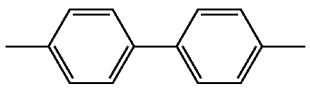

or
formula [II-b]:

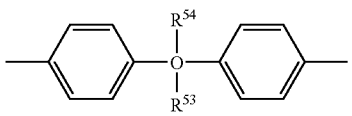

wherein $R^{53}$ to $R^{54}$, which may be the same or different, are independently selected from the group consisting of alkyl (having 1 to 8 carbon atoms) or hydrogen, and wherein $(F)^{h+}$ represents ammonium ion or a cation derived from an organic amino compounds or a basic dye wherein h is 1 or 2, $m^4$ is an integer from 1 to 4 and $K^4$ is the ratio of $m^4/h$, and
b) monoazo metal complex dye represented by the formula [III] formula [III]:

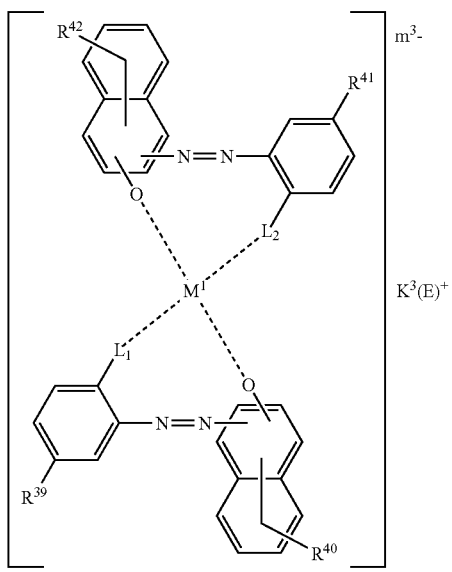

wherein $R^{39}$, $R^{41}$, which may be the same or different, are Cl, $SO_2(-R^{44})(-R^{46})$, or $SO_2R^{43}$; $R^{44}$ and $R^{45}$, which may be the same or different, are independently hydrogen atom, liner or branched C1–C4 alkyl, $R^{43}$ is linear or branched C1–C4 alkyl; $R^{40}$ and $R^{42}$, which may be the same or different, are hydrogen, liner or branched C1–C18 alkyl group, liner or branched C2–C18 alkenyl group, sulfonamide group, carboxyl group, mesyl group, hydroxyl group. C1–C18 alkoxy group, acethylamino group, benzoylamino group, halogen atom or $—CONH—R^{46}$; $R^{46}$ is functional group selected from unsubstituted or substituted liner or branched C1–C18 alkyl or unsubstituted or substituted C6–C18 aryl group; $L_1$ and $L_2$ are independently O or COO; $(E)^+$ are $H^+$, cation of alkali metal, ammonium ion, cations of organic amine including aliphatic primary, secondary and tertiary amines, quaternary ammonium ion; $K^3$ is an integer; $m^3$ is 0, 1 or 2; and $M^1$ is a metal having ionic valency from 2 to 4, wherein the amount of amine salts of anthraquinone dyes of formula [I] or formula [II] compared to the amount of monoazo complex dyes of the formula [III] is in the ratio of from 5:1 to 1:1.

8. The composition of claim 7 wherein the laser-transmitting black colorant comprises amine salts of anthraquinone dye of formula [I] wherein at least one of $R^9$, $R^{10}$, $R^{11}$, $R^{12}$ and $R^{13}$ of formula [I-a] is sulfonyl group.

9. A black colorant suitable for being mixed with a thermoplastic resin used in laser welding applications applied to a laser welding comprising a mixture of
a) amine salts of anthraquinone dyes of formula [I] or formula [II] wherein Formula [I] is:

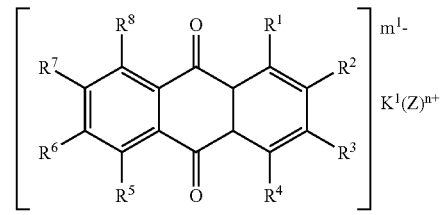

wherein $R^1$ to $R^8$, which may be the same or different, are independently selected from the group consisting of H, alkyl, aryl, alkenyl, alkoxy, amino, hydroxy, halogen atom, acyl, acyloxy, acylamide, acyl-N-alkylamide, carboxyl, alkoxycarbonyl, cyclohexylamide, sulfonyl, formula [I-a], or —Y—W, and at least one of $R^1$ to $R^8$ is of formula [I-a]; wherein Y is S, O, or NH; and wherein W is selected from unsubstituted or substituted alkyl group, alkenyl group, and unsubstituted or substituted aryl group; wherein $(Z)^{n+}$ represents a cation derived from an organic amine compounds or a basic dye; wherein n is 1 or 2, $m^1$ is an integer from 1 to 4 and $K^1$ is the ratio of $m^1/n$; and wherein formula [I-a] is:

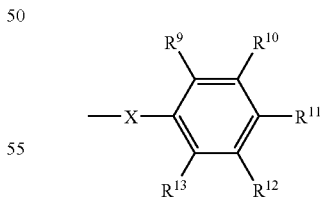

wherein X is O or NH, and $R^9$ to $R^{13}$, which may be the same or different, are independently selected from the group consisting of H, alkyl, aryl, alkenyl, alkoxy, amino, N-alkylamide, N-arylamide, hydroxy, halogen atom, acyl, acyloxy, acylamide, acyl-N-alkylamide, carboxyl, alkoxycarbonyl, or sulfonyl; wherein at least one wherein at least one of $R^1$ to $R^{13}$ is sulfonyl group wherein formula [II] is:

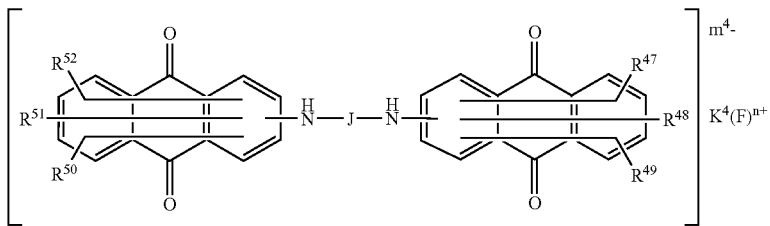

wherein $R^{47}$ to $R^{52}$, which may be the same or different, are independently selected from the group consisting of H, alkyl, aryl, alkenyl, alkoxy, amino, N-alkylamide, N-arylamide, hydroxy, halogen atom, acyl, acyloxy, acylamide, acyl-N-alkylamide, carboxyl, alkoxycarbonyl, or sulfonyl; and at least one of $R^{47}$ to $R^{52}$ is of sulfonyl, and fomula J in formula [II] is selected from formula [II-a] or formula [II-b] and binds two anthraquinone; formula [II-a]:

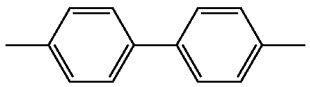

or formula [II-b]:

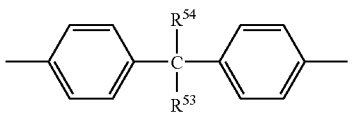

wherein $R^{53}$ to $R^{54}$, which may be the same or different, are independently selected from the group consisting of alkyl (having 4 to 8 carbon atoms) or hydrogen, and wherein $(F)^{h+}$ represents ammonium ion or a cation derived from an organic amino compounds or a basic dye wherein h is 1 or 2, $m^4$ is an integer from 1 to 4 and $K^4$ is the ratio of $m^4/h$, and b) monoazo metal complex dye representad by the formula [III] formula [III]:

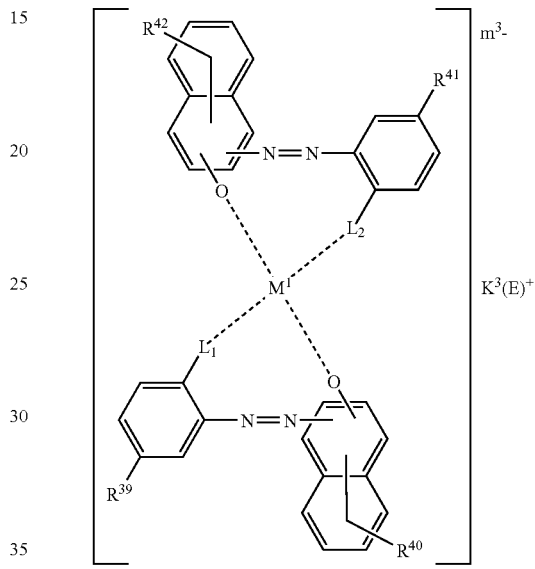

wherein $R^{39}$, $R^{41}$, which may be the same or different, are Cl, $SO_2(—R^{44})(—R^{45})$, or $SO_2R_{43}$; $R_{44}$ and $R_{45}$, which may be the same or different, are independently hydrogen atom, liner or branched C1–C4 alkyl, $R_{43}$ is linear or branched C1–C4 alkyl; $R^{40}$ and $R^{42}$, which may be the same or different, are hydrogen, liner or branched C1–C18 alkyl group, liner or branched C2–C18 alkenyl group, sulfonamide group, carboxyl group, mesyl group, hydroxyl group, C1–C18 alkoxy group, acethylamino group, benzoylamino group, halogen atom or —CONH—$R^{46}$; $R^{46}$ is functional group selected from unsubstituted or substituted liner or branched C1–C18 alkyl or unsubstituted or substituted C6–C18 aryl group; $L_1$ and $L_2$ are independently O or COO; $(E)^+$ are $H^+$, cation of alkali metal, ammonium ion, cations of organic amine including aliphatic primary, secondary and tertiary amines, quatemary ammonium ion; $K^3$ is an integer; $m^3$ is 0, 1 or 2; and $M^1$ is a metal having ionic valency from 2 to 4, wherein the amine salts of anthraquinone dyes and the manoazo metal complex dye are present in the ratio of from 5:1 to 1:1.

10. The black colorant of claim 8 wherein the laser-transmitting black colorant comprises amine salts of anthraquinone dye of formula [I] where as at least one of $R^9$, $R^{10}$, $R^{11}$, $R^{12}$ and $R^{13}$ of formula [I-a] is sulfonyl group.

* * * * *